2,928,811
EPOXIDE RESIN-AMIDE COMPOSITIONS
William J. Belanger, Louisville, Ky., assignor to Devoe & Raynolds Company, Inc., a corporation of New York
No Drawing. Application November 18, 1957
Serial No. 696,951
4 Claims. (Cl. 260—47)

This invention relates to heat curable compositions of matter particularly suitable for the formation of castings, pottings, and thin films as used in coatings, adhesives and the like. More particularly, the invention is concerned with compounding and reacting glycidyl polyethers with selected amides to form intermediates having epoxide groups as well as valuable insoluble, infusible cured products.

It is known to use amides as curing agents for glycidyl polyethers, particularly amides which are believed to decompose. However, reactions involving glycidyl polyethers and these amides are quite sluggish. Representative amides of this type are dicyandiamide, which is a dimer of cyanamide, and benzoguanamine, derived from melamine, which is an amide of cyanuric acid. Melamine is 2,4,6-triamino-1,3,5-triazine, whereas the amide benzoguanamine is 4,6-diamino-2-phenyl-1,3,5-triazine. When these amides are used with glycidyl polyethers, even if a solvent is employed, the reaction is too slow for many purposes. In accordance with this invention, however, glycidyl polyethers are reacted with dicyandiamide or benzoguanamine in the presence of special accelerators. It has been found that quaternary ammonium salts are capable of accelerating or activating the reaction between glycidyl polyethers and these amides. When benzoguanamine or dicyandiamide is used in combination with these activators, they display surprisingly increased activity as curing agents for glycidyl polyethers. The invention thus provides a process for curing glycidyl polyethers which includes mixing and reacting the glycidyl polyether, benzoguanamine or dicyandiamide, and, as an activator for the amide, a quaternary ammonium salt.

Quaternary ammonium salts are those salts of strong and weak organic and inorganic acids. Included are such acids as acetic, oxalic, formic, fumaric, benzoic, and maleic, as well as hydrochloric, phosphoric, sulfuric, and hydrobromic acids, having pK values not exceeding six. These quaternary ammonium salts are well known tetraalkyl, aryl trialkyl and alkaryl trialkyl ammonium salts of acids having pK values not exceeding six, wherein the aryl, alkaryl and alkyl substituents each have no more than eight carbon atoms. Typical quaternary ammonium salts are benzyltrimethyl ammonium acetate, benzyltriethyl ammonium formate, di(phenyltrimethyl)ammonium maleate, di(tolyl trimethyl ammonium)fumarate, benyltrimethyl ammonium ethyl hexoate, di(benzyltrimethyl ammonium)oxalate, di(benzyltrimethyl ammonium)tartarate, benzyltrimethyl ammonium lactate, ethylene bis(trimethyl ammonium acetate), octyl trimethyl ammonium benzoate, benzyltributyl ammonium acetate, benzyltrimethyl ammonium chloride, benzyltrimethyl ammonium phosphate, trimethyl benzyl ammonium sulphates, benzyltriethyl ammonium chloride, tributyl benzyl ammonium chloride, tripropyl benzyl ammonium chloride, tolyl trimethyl ammonium chloride, octyl trimethyl ammonium bromide, ethylene bis(trimethyl ammonium bromide), ethyl pyridine chloride, etc., preferred salts being quaternary ammonium halides. Also intended are ion exchange resins containing quaternary ammonium salts of strong acids. The quaternary ammonium salts are utilized in amounts varying from 0.1 percent to 10 percent by weight of the glycidyl polyether-amide composition, and more preferably in amounts varying from 0.1 percent to 2 percent by weight of the amide-polyether composition.

Glycidyl polyethers with which this invention is concerned are now well known and need not be discussed at length herein. The most useful of these epoxide resins is made from the reaction of a polyhydric phenol with epihalohydrin or glycerol dihalohydrin and a sufficient amount of a caustic alkali to combine with the halogen of the halohydrin. Products resulting from the reaction of a polyhydric phenol with epichlorhydrin or glycerol dichlorhydrin are monomeric or straight chain polymeric products characterized by the presence of more than one epoxide group, i.e., a 1,2-epoxy equivalency greater than one. Dihydric phenols that can be used for this purpose include bisphenol, resorcinol, catechol, hydroquinone, methyl resorcinol, 2,2-bis(4-hydroxyphenyl)butane, 4,4'-dihydroxybenzophenone, bis(4-hydroxyphenyl)ethane, and 1,5-dihydroxy naphthalene. The preparation of polyepoxides from polyhydric phenols and epihalohydrin is described in U.S. Patents 2,467,171, 2,538,072, 2,582,985, 2,615,007 and 2,698,315, the proportion of halohydrin to dihydric phenol being at least about 1.2 to 1, up to around 10 to 1.

Higher melting point resins are made from the reaction of such resins with a further amount of dihydric phenol less than that equivalent to the epoxide content of the resin, as set forth in U.S. Patent 2,615,008. Halohydrins can be further exemplified by 3-chloro-1,2-epoxy butane, 3-bromo-1,2-epoxy hexane, 3-chloro-1,2-epoxy octane and the like. Another group of glycidyl polyethers is produced by the reaction of a polyhydric alcohol with epichlorhydrin or glycerol dichlorhydrin as disclosed in Zech patent U.S. 2,581,464. While the invention is applicable to epoxides generally, preferred polyepoxides are glycidyl polyethers of aromatic polyhydric compounds having weights per epoxide group of 180 to 2000.

In carrying out the process of this invention, the glycidyl polyether and benzoguanamine or dicyandiamide are heated together until a homogeneous composition is formed, generally at a temperature in the range of 140° C. to 180° C., and then the quaternary ammonium salt is added. No particular difficulties are encountered except those due to the limited solubilities of dicyandiamide and benzoguanamine. Accordingly, when films of intermediate epoxide resins, to be described, are prepared, it will be desirable to use a solvent. In the case of castings, no solvent is employed. When a solvent is used, a strong solvent is necessary because of the solubility characteristics of both of the amides, as well as the glycidyl polyether. In other words, a polar solvent is used rather than a non-polar solvent, particularly ethers and ketones, esters being less desirable because of their possible reaction with the amide. For this purpose, suitable solvents are ethers such as "Dioxane" (glycol ethylene ether), the "Cellosolves" such as ethyl "Cellosolve" (2-ethoxyethanol), butyl "Cellosolve" (butoxy ethanol), and "Cellosolve" acetate (2-ethoxyethanol acetate), etc.; ketones such as acetone, methyl ethyl ketone, methyl isobutyl ketone, diisobutyl ketone, etc.; and mixtures of ketone solvents and ether solvents with aromatic hydrocarbon solvents, such as xylene, toluene, benzene, etc.

Of course, when a solvent is used, the reaction temperature cannot be above the boiling point of the solvent. In general, the amide and the glycidyl polyether are reacted at temperatures of from 100° C. to 150° C., a period of from two to sixteen hours being recommended for cures. If it is deemed desirable to increase the rate of reaction, it will be necessary to use a higher boiling point solvent so that the reaction can be carried out at a higher temperature.

The following examples are illustrative of a desired method of preparing the polyepoxides forming an aspect of this invention. It is understood, of course, that the procedures are exemplary only and that variations will occur to those skilled in the art. The glycidyl polyethers employed in the following examples are prepared in the manner described in U.S. Patents 2,615,007, 2,615,008, 2,582,985 and 2,581,464, by the condensation of varying proportions of epichlorhydrin to bisphenol or polyhydric alcohol and subsequent dehydrohalogenation with sodium hydroxide. The table which follows indicates the ratio of epichlorhydrin to bisphenol or alcohol used to prepare the glycidyl polyethers. In the examples and tables which follow, BTMACl will be used instead of benzyltrimethyl ammonium chloride and the polyepoxides will be referred to as Epoxide A, B, C, etc. Thus, Epoxide A is made from 1.0 mol of bisphenol and 10.0 mols of epichlorhydrin, and has an epoxide equivalent of 190.

TABLE OF EPOXIDES

| Epoxide | Hydroxyl compound | Mol ratio | | Epoxide Equivalent |
|---|---|---|---|---|
| | | Epichlorhydrin | Hydroxyl Compound | |
| A | Bisphenol | 10.0 | 1.0 | 190 |
| B | do | 2.04 | 1.0 | 340 |
| C | do | 1.21 | 1.0 | 960 |
| D | Trimethylol propane | 2.0 | 1.0 | 172 |
| E | Glycerol | 3.0 | 1.0 | 155 |
| F | Resorcinol | 10.0 | 1.0 | 126 |

*Example 1*

To illustrate effectively the use of quaternary ammonium salts as accelerators for the benzoguanamine-glycidyl polyether reaction, gel times are given rather than curing times, the gel being the first stage of an infusible, insoluble material.

In a suitable container, the glycidyl polyether and benzoguanamine are heated with stirring at a temperature of about 140° C. until a homogeneous melt is obtained, whereupon a catalytic amount of a sixty percent aqueous solution of benzyltrimethyl ammonium chloride is blended into the melt. The mixture is poured into an aluminum cup and is heated in a 150° C. oven until gelation occurs.

Following the same procedure but without the addition of the accelerator, mixtures of benzoguanamine and epoxides are reacted at elevated temperatures shown and for such time as to obtain gels.

The tables which follow indicate the composition of the mixtures used and the time and temperature required for gelation to occur.

TABLE

EXAMPLE 1A

| Epoxide | Epoxide, weight (grams) | Benzoguanamine, weight (grams) | BTMACl,[1] weight (grams) | Temperature, °C. | Gel time (min.) |
|---|---|---|---|---|---|
| A | 8.0 | 2.0 | 0 | 150 | >150 |
| A | 8.0 | 2.0 | 0.12 | 150 | 64 |
| A | 8.0 | 2.0 | 0.23 | 150 | 33 |
| A | 8.0 | 2.0 | 0 | 180 | 30 |
| A | 8.0 | 2.0 | 0.12 | 180 | 15 |
| A | 8.0 | 2.0 | 0.23 | 180 | 7 |
| A | 8.5 | 1.5 | 0 | 125 | 525 |
| A | 8.5 | 1.5 | 0.12 | 125 | 240 |
| A | 8.5 | 1.5 | 0.23 | 125 | 125 |
| A | 8.5 | 1.5 | 0 | 150 | 525 |
| A | 8.5 | 1.5 | 0.12 | 150 | 115 |
| A | 8.5 | 1.5 | 0.23 | 150 | 75 |
| A | 8.5 | 1.5 | 0 | 180 | 85 |
| A | 8.5 | 1.5 | 0.12 | 180 | 55 |
| A | 8.5 | 1.5 | 0.23 | 180 | 15 |
| A | 9.0 | 1.0 | 0 | 125 | 525 |
| A | 9.0 | 1.0 | 0.12 | 125 | 180 |
| A | 9.0 | 1.0 | 0.23 | 125 | 120 |
| A | 9.0 | 1.0 | 0 | 150 | 525 |
| A | 9.0 | 1.0 | 0.12 | 150 | 115 |
| A | 9.0 | 1.0 | 0.23 | 150 | 60 |
| A | 9.0 | 1.0 | 0 | 180 | 180 |
| A | 9.0 | 1.0 | 0.12 | 180 | 55 |
| A | 9.0 | 1.0 | 0.23 | 180 | 15 |

EXAMPLE 1B

| | | | | | |
|---|---|---|---|---|---|
| B | 8.0 | 2.0 | 0 | 150 | 28 |
| B | 8.0 | 2.0 | 0.4 | 150 | 21 |
| B | 9.0 | 1.0 | 0 | 150 | 35 |
| B | 9.0 | 1.0 | 0.4 | 150 | 13 |
| C | 8.0 | 2.0 | 0 | 150 | 35 |
| C | 8.0 | 2.0 | 0.4 | 150 | 20 |
| C | 9.0 | 1.0 | 0 | 150 | 67 |
| C | 9.0 | 1.0 | 0.4 | 150 | 24 |
| E | 8.0 | 2.0 | 0 | 150 | 14 |
| E | 8.0 | 2.0 | 0.4 | 150 | ²9 |
| E | 9.0 | 1.0 | 0 | 150 | 40 |
| E | 9.0 | 1.0 | 0.4 | 150 | 20 |
| F | 8.0 | 2.0 | 0 | 150 | 21 |
| F | 8.0 | 2.0 | 0.4 | 150 | ²8 |
| F | 9.0 | 1.0 | 0 | 100 | 184 |
| F | 9.0 | 1.0 | 0.4 | 150 | 20 |

[1] BTMACl represents benzyltrimethyl ammonium chloride (60 percent aqueous solution).
[2] Became exceedingly exothermic.

*Example 2*

In a beaker, 9.0 grams of Epoxide B and 1.0 gram of dicyandiamide are heated with stirring at 170° C. until a homogeneous melt is obtained. Into the melt is blended 0.4 gram of a sixty percent aqueous solution of benzyltrimethyl ammonium chloride after which the mixture is poured into an aluminum cup and is heated in a 150° C. oven. Gelation occurs after heating for ten minutes.

Following the same procedure, from a blend of 9.0 grams of Epoxide B and 1.0 gram of dicyandiamide, without the presence of an accelerator, a gel is obtained after heating for twenty minutes at 150° C.

*Example 3*

In accordance with the procedure of Example 1, varying amounts of Epoxide A and benzoguanamine are heated until gels result. As accelerators, tetramethyl ammonium chloride and benzyltrimethyl ammonium acetate are employed. For comparison, without the use of an accelerator, compositions are also heated until gels are obtained.

The table following indicates the compositions employed and the length of time the mixtures are heated at 150° C. to obtain gels.

| Epoxide A, weight (grams) | Benzoguanamine, weight (grams) | Quaternary ammonium salt | Quaternary ammonium salt weight (grams) | Gel Time, minutes |
|---|---|---|---|---|
| 8.0 | 2.0 | | 0 | 56 |
| 8.0 | 2.0 | TMACl[1] | 0.4 | 24 |
| 8.0 | 2.0 | BTMAAc[2] | 0.4 | 7 |
| 9.0 | 1.0 | | 0 | 190 |
| 9.0 | 1.0 | TMACl[1] | 0.4 | 39 |
| 9.0 | 1.0 | BTMAAc[2] | 0.4 | 5 |

[1] TMACl represents tetramethyl ammonium chloride (60 percent aqueous solution).
[2] BTMAAc represents benzyltrimethyl ammonium acetate (41 percent aqueous solution).

Among the advantages of this invention is the fact that various epoxide resins can be prepared. If two to four mols of a glycidyl polyether are used per mol of the amide, valuable intermediate resinous compositions having epoxide groups are obtainable. These intermediates polyepoxides are distinguishable from the cured compositions because of the existence of epoxide groups which can be identified. In addition, they are not insoluble and infusible, but, rather, undergo reactions characteristic of other epoxide resins. Thus, the intermediate compositions can be further modified, heat cured to an insoluble, infusible state, or more rapidly cured with known epoxide curing agents such as amines as seen in Example 10.

In accordance with this embodiment of the invention, intermediate epoxides having a variety of epoxy equivalents are possible. The glycidyl polyether, the amide and the quaternary ammonium salt, with or without a solvent, are reacted at elevated temperatures for such periods as to obtain intermediate epoxide resins of desired or theoretical epoxy equivalencies, the epoxy equivalent being governed by periodic determinations being made during the course of the reaction. The composition when cooled is the desired intermediate epoxide resin, intermediate resins having epoxy equivalencies in the range of 230 to 1000 being obtainable. The preparation of these intermediates can best be illustrated by reference to the following examples.

*Example 4*

|  | Weight | Molar ratio |
|---|---|---|
| Epoxide A | 380.0 grams | 2 |
| Benzoguanamine | 93.5 grams | 1 |
| "Dioxane" | 474.0 grams |  |
| BTMACl | 2.5 grams of a 60 percent aqueous solution |  |

Into a one liter, three-necked, round bottomed flask fitted with a mechanical agitator, thermometer and reflux condenser are charged the Epoxide A, benzoguanamine, a portion (125.0 grams) of the Dioxane and the benzyltrimethyl ammonium chloride solution. The flask contents are heated to reflux temperature (about 128° C.) and are maintained at reflux for seven hours after which the clear viscous reaction mixture is cooled to room temperature, the remainder (349.0 grams) of the Dioxane is added and the solution is filtered. The filtered intermediate epoxide resin solution has a viscosity of U–V (Gardner-Holdt) and a solids content of 57 percent as determined by heating for one hour at 180° C. The intermediate epoxide resin prepared has an epoxide equivalent of 499 (based on solids).

*Example 5*

|  | Weight | Molar ratio |
|---|---|---|
| Epoxide A | 380.0 grams | 3 |
| Benzoguanamine | 62.5 grams | 1 |
| Dioxane | 443.0 grams |  |
| BTMACl | 2.5 grams of a 60 percent aqueous solution |  |

Following the procedure of Example 4, an intermediate epoxide resin is prepared by refluxing for six and a half hours the Epoxide A and benzoguanamine in the presence of a portion (125.0 grams) of the Dioxane and the benzyltrimethyl ammonium chloride solution. Before filtering, the remainder (318.0 grams) of Dioxane is added. The filtered solution has a viscosity of B (Gardner-Holdt) and a solids content of 53 percent as determined by heating for one hour at 180° C. The epoxide equivalent of the intermediate epoxide resin prepared (based on solids) is 394.

*Example 6*

|  | Weight | Molar ratio |
|---|---|---|
| Epoxide D | 137.6 grams | 4 |
| Benzoguanamine | 18.7 grams | 1 |
| Dioxane | 106.3 grams |  |
| Toluene | 50.0 grams |  |
| BTMACl | 1.0 gram of a 60 percent aqueous solution |  |

An intermediate epoxide resin is prepared as described in the procedure of Example 4 by refluxing for eight hours the Epoxide D and benzoguanamine in the presence of a portion (50.0 grams) of the Dioxane and the benzyltrimethyl ammonium chloride solution. Before filtering, the remainder (56.3 grams) of the Dioxane and the toluene are added. The intermediate epoxide resin solution has a viscosity of E (Gardner-Holdt), the solids content being 53.7 percent as determined by heating for one hour at 180° C. The intermediate epoxide resin prepared has a weight per epoxide group of 533 (based on solids).

*Example 7*

|  | Weight | Molar ratio |
|---|---|---|
| Epoxide A | 267.0 grams | 4 |
| Benzoguanamine | 33.0 grams | 1 |
| Dioxane | 100.0 grams |  |
| 2-ethoxyethanol | 100.0 grams |  |
| BTMACl | 5.0 grams of a 60 percent aqueous solution |  |

Following the procedure of Example 4, an intermediate epoxide resin is prepared by heating at 120° C. for fifteen hours the Epoxide A and the benzoguanamine in the presence of Dioxane and benzyltrimethyl ammonium chloride. Before filtering, the 2-ethoxyethanol is added. The intermediate resin solution has a viscosity of $Z_1$ (Gardner-Holdt) at a non-volatile content of sixty percent as determined by heating for one hour at 180° C. The epoxide resin, based on solids, has an equivalent weight per epoxide group of 476.

*Example 8*

|  | Weight | Molar ratio |
|---|---|---|
| Epoxide F | 101.0 grams | 4 |
| Benzoguanamine | 18.7 grams | 1 |
| Dioxane | 60.0 grams |  |
| BTMACl | 1.4 grams of a 60 percent aqueous solution |  |

Following the procedure of Example 4, an intermediate epoxide resin is prepared by refluxing for four hours at 130° C. the Epoxide F, benzoguanamine, Dioxane and benzyltrimethyl ammonium chloride solution. The filtered intermediate epoxide resin solution has a viscosity of U (Gardner-Holdt) at 75.8 percent solids content as determined by heating at 180° C. for one hour. The epoxide resin has a weight per epoxide group of 248 (based on solids).

*Example 9*

From the intermediate epoxide resin solutions of the preceding examples, films are drawn down on a glass plate with a three mil blade and are cured by baking at 180° C. for twenty minutes.

The table which follows lists the physical properties of the corresponding cured films.

| Epoxide resin of— | Hardness | Flexibility | Adhesion | Mar resistance |
|---|---|---|---|---|
| Example 4 | Excellent | Good | Very good | Very good. |
| Example 5 | do | do | do | Do. |
| Example 6 | Good | Very good | do | Do. |

*Example 10*

To portions of the previously prepared epoxide resin solutions are added one equivalent weight of tetraethylenepentamine and from the resulting blends, films are drawn down on a glass plate and are cured by heating for twenty minutes at 180° C.

The table following enumerates the physical properties of the corresponding cured films prepared.

| Epoxide resin of— | Hardness | Flexibility | Adhesion | Mar resistance |
|---|---|---|---|---|
| Example 4 | Excellent | Good | Very good | Very good. |
| Example 5 | do | Very good | do | Do. |
| Example 6 | Good | do | do | Good. |

The foregoing examples show that epoxide resins having a wide range of epoxide equivalents can be prepared in accordance with this invention. In addition, the ratio of glycidyl polyether to amide varies widely depending upon whether intermediates or cured compositions are prepared. As indicated hereinbefore, from two to four mols of glycidyl polyether are employed per mol of amide when intermediate epoxides are made. However, cured compositions are obtained using more than four mols of glycidyl polyether per mole of amide. Up to ten mols can be used, although not with equivalent results. In other words, from 0.1 to 0.5 mol of amide can be used per mol of glycidyl polyether.

Intermediate epoxides of this invention can be reacted with compounds having any of the functional groups such as carboxyl, amine, and phenolic substituents, for example, diethylene triamine, oxalic acid, $BF_3$ monoethyl amine, etc. In addition, the epoxides can also be heat cured to form films having properties making them useful in the coatings field. Obviously, many modifications and variations of the invention as hereinbefore set forth can be made without departing from the spirit and scope thereof, and, therefore, such modifications are deemed to be within the scope of this invention.

What is claimed is:

1. In the process for resinifying and curing a glycidyl polyether of a polyhydric compound of the group consisting of polyhydric phenols and polyhydric alcohols, said glycidyl polyether having an epoxy equivalency greater than one and an epoxide equivalent not exceeding two thousand, wherein the glycidyl polyether is mixed and heat reacted with an amide selected from the group consisting of benzoguanamine and dicyandiamide, the improvement which comprises heat reacting the glycidyl polyether and the amide utilizing as an accelerator for the reaction 0.1 to 10 percent, by weight based on the polyether-amide mixture, of an activator consisting of a quaternary ammonium salt selected from the group consisting of tetraalkyl, aryl trialkyl and alkaryl trialkyl ammonium salts of acids having pK values not exceeding six, wherein the aryl, alkaryl and alkyl substituents have no more than eight carbon atoms, considering an epoxide equivalent glycidyl polyether as the weight in grams of polyether per epoxide group.

2. The process of claim 1 wherein the glycidyl polyether has an epoxide equivalent not exceeding one thousand and wherein the activator is an aryl trialkyl ammonium halide.

3. The process of claim 2 wherein the glycidyl polyether has an epoxide equivalent of 180 to 250 and wherein the aryl trialkyl ammonium halide is benzyl trimethyl ammonium chloride.

4. A heat curable composition of matter comprising a glycidyl polyether of a polyhydric compound of the group consisting of polyhydric phenols and polyhydric alcohols, said polyether having an epoxide equivalency greater than one and an epoxide equivalent not exceeding two thousand, an amide selected from the group consisting of benzoguanamine and dicyandiamide, and from 0.1 to 10 percent based on the polyether-amide mixture of a quaternary ammonium salt selected from the group consisting of tetraalkyl, aryl trialkyl, and alkaryl trialkyl ammonium salts of acids having pK values not exceeding six, wherein the aryl alkaryl and alkyl substituents have no more than eight carbon atoms, considering an epoxide equivalent as the weight in grams of polyether per epoxide group.

References Cited in the file of this patent

UNITED STATES PATENTS

| | | |
|---|---|---|
| 2,752,269 | Condo et al. | June 26, 1956 |
| 2,768,992 | Zukas | Oct. 30, 1956 |
| 2,865,886 | Greenlee | Dec. 23, 1958 |

FOREIGN PATENTS

| | | |
|---|---|---|
| 133,819 | Australia | July 15, 1946 |